(No Model.)  2 Sheets—Sheet 1.

E. A. SPERRY.
POWER TRANSMITTING DEVICE.

No. 557,162. Patented Mar. 31, 1896.

WITNESSES
A. F. Macdonald.
B. B. Hull.

INVENTOR
Elmer A. Sperry,
by
Geo. R. Blodgett,
Atty.

(No Model.) 2 Sheets—Sheet 2.

E. A. SPERRY.
POWER TRANSMITTING DEVICE.

No. 557,162. Patented Mar. 31, 1896.

WITNESSES
A. F. Macdonald.
B. B. Hill.

INVENTOR
Elmer A. Sperry,
by
Geo. R. Blodgett,
Atty.

UNITED STATES PATENT OFFICE.

ELMER A. SPERRY, OF CLEVELAND, OHIO, ASSIGNOR TO THE GENERAL ELECTRIC COMPANY, OF NEW YORK.

POWER-TRANSMITTING DEVICE.

SPECIFICATION forming part of Letters Patent No. 557,162, dated March 31, 1896.

Application filed April 12, 1895. Serial No. 545,434. (No model.)

*To all whom it may concern:*

Be it known that I, ELMER A. SPERRY, a citizen of the United States, residing at Cleveland, in the county of Cuyahoga, State of Ohio, have invented certain new and useful Improvements in Power-Transmitting Devices, of which the following is a specification.

This invention relates to power-transmitting devices, and has especial reference to the device embraced in my application filed March 6, 1893, Serial No. 464,651, in which a driving and a driven shaft are so connected as to readily assume different relative positions without interfering with the power-driving connection and whereby the movements of the shafts from a concentric to an eccentric position relatively to each other are retarded or restricted to a minimum degree, so that when power is being transmitted from one shaft to another the latter may sustain a series of vigorous shocks or blows and by reason of its entire freedom of movement not transfer them back to the driving-power connection, and at the same time the driving and the driven shaft may sustain various positions relative to each other.

This invention consists in an improved device of this character, as hereinafter set forth and claimed.

Figure 1:
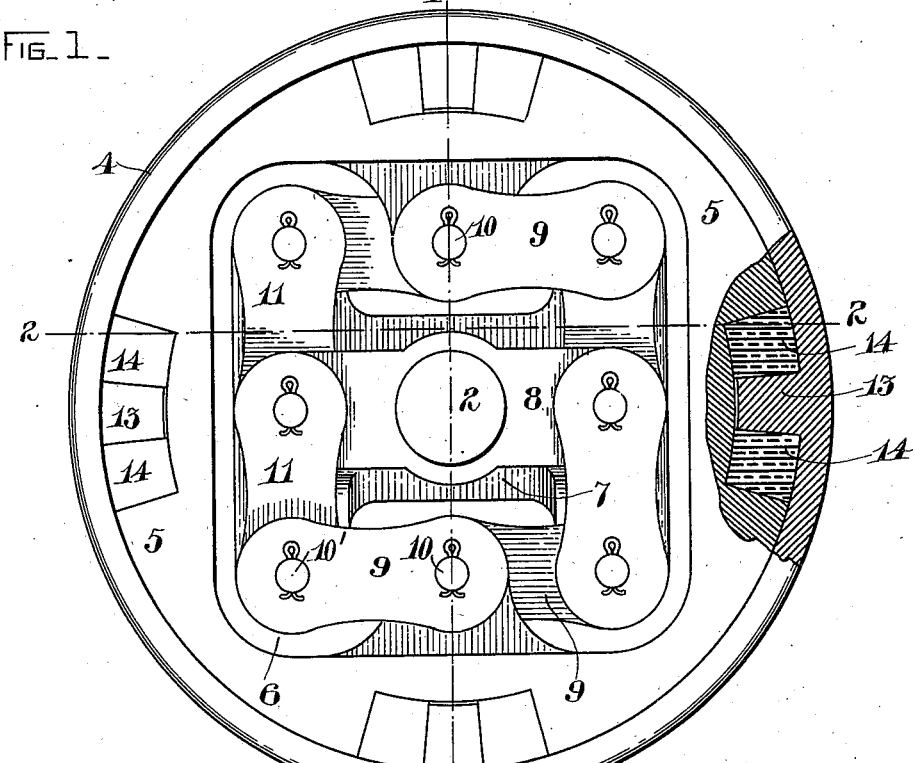
Figure 2:
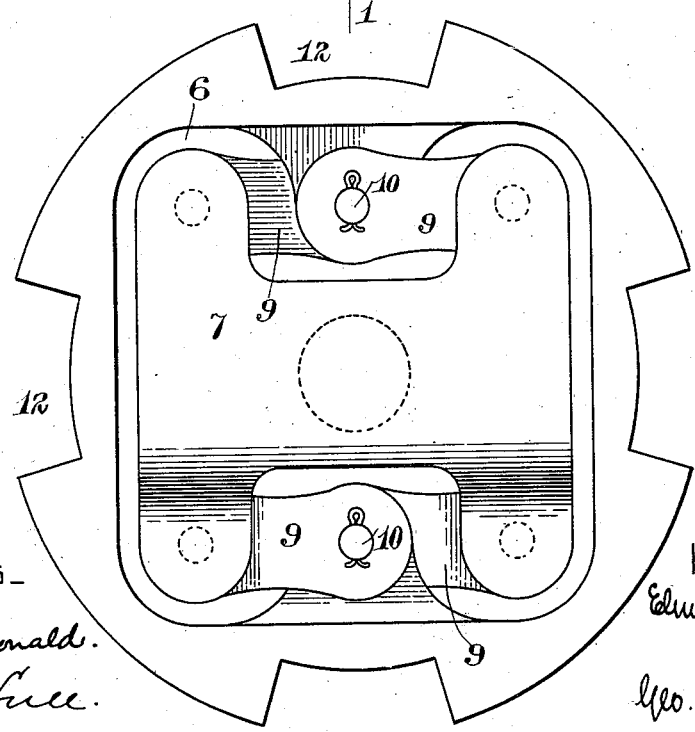
Figure 3:
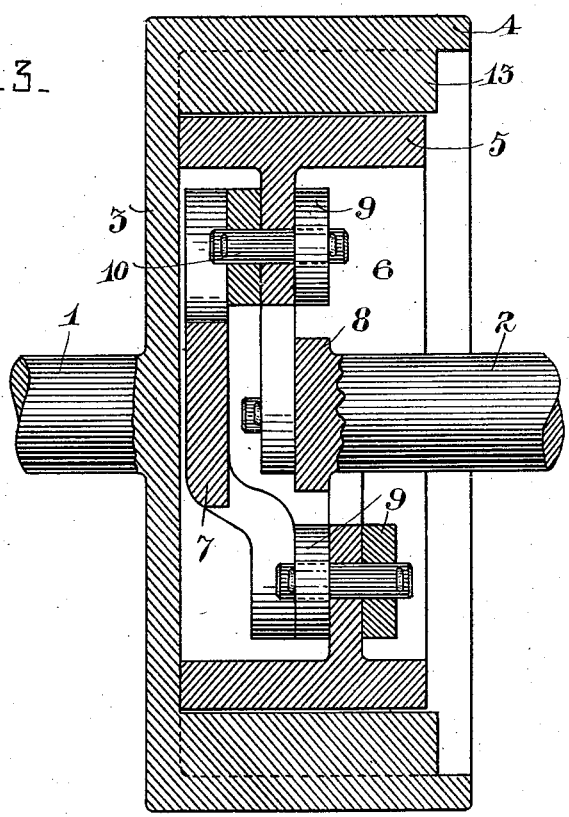
Figure 4:
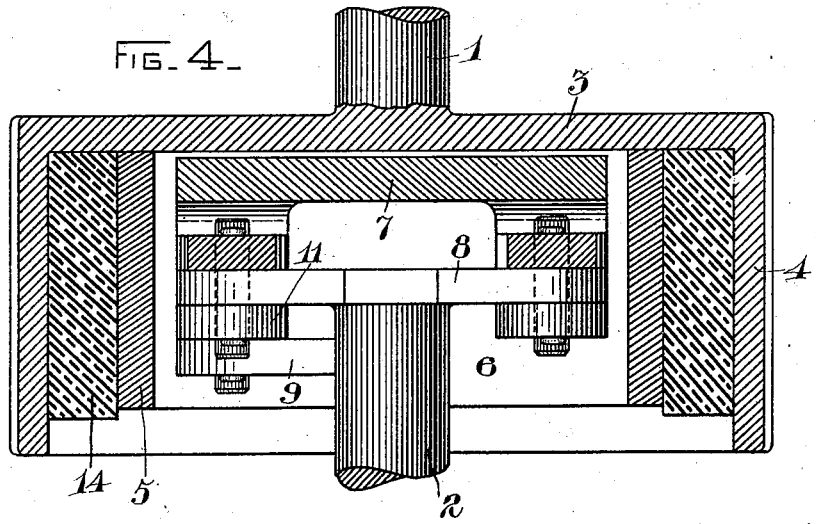

In the accompanying drawings, Figure 1 is an end view in elevation of the invention. Fig. 2 is a view of the back of the internal removable portion of the invention. Fig. 3 is a vertical section on the line 1 1 of Fig. 1, and Fig. 4 is a transverse horizontal section on the line 2 2 of Fig. 1.

1 and 2 indicate two power-shafts connected together as follows: Upon the shaft 1 is suitably mounted the disk 3, provided with the flange 4, forming a drum. Within the drum or flanged disk 3 4 is located a disk 5, having a central chamber or aperture 6, in which is located what will be termed a "float" 7, a number of links pivoted to each other, to the disk 5, and to the float 7, and a cross-bar 8, which is mounted on the end of the shaft 2.

9 9 are pairs of links pivoted at their inner end to pivot-bearings 10 on internal projections of the disk 5, and at their outer end to pivot-bearings 10' on the lower corners of the float 7, and 11 11 are pairs of links pivoted at one end to the pivot-pins at the corners of the float 7, and at their outer end to the cross-bar 8. The function of the float 7 is to keep the pivotal connection of the two sets of links in their proper relation to each other, and especially in the proper relation to those diagonally opposite with reference to the corners of the float 7, and also permit a transverse movement of the side links and cross-bar 8 independently of the float.

While a specific arrangement of links in connection with the clutching-sections of the coupling is set forth, it is to be understood that the arrangement of the links may be varied so long as they accomplish the same result.

The edge of the disk 5 is formed with recesses or notches 12, and the flange 4 of disk 3 with projections 13, which are located in the notches 4, spaces being afforded by the notches 12 on both sides of the projections 13 in which are located blocks of rubber 14, serving as cushions against shocks for the projections 13, and the ends of the notches 12, in the opposite and irregular movements of the disks 3 and 5, responding to the movements of the shafts 1 and 2. This latter construction constitutes a coupling forming a clutched connection of the two shafts, the blocks of rubber 14 taking up with a cushioning effect in a circumferential direction the shocks incident to the irregular movement of the shafts 1 and 2 in railway-motors, to which it has special application, the shaft 1 being fixed to one portion, 3 4, of the coupling, and the shaft 2 being loosely connected to the other portion, 5, by means of the links and the float, as hereinbefore set forth.

When the shafts 1 and 2 are in their normal position concentric with each other, the construction of the parts is such that the shafts are maintained rigidly in alinement with each other, and they are permitted to readily assume irregular positions without affecting the power-transmitting connection.

By means of the transmitter, constructed as set forth, the shafts 1 and 2 cannot only take up a position eccentric to one another, but can also assume different positions and quickly respond to and assume different irregular positions relative to each other.

It will be understood that in the practical construction of this invention the holes in the links for the pivot-pins 10' will be made loose enough to allow for the necessary lost motion to enable the several parts to move freely.

What I claim is—

1. A power-transmitting device consisting of a coupling formed of two sections having interlocking portions clutched together, a shaft fixed to one of said sections, a second shaft, and a series of links connecting the second shaft with the other of said sections.

2. A power-transmitting device consisting of a coupling formed of two sections having interlocking portions clutched together, circumferential cushioning devices interposed between said interlocking portions, a shaft fixed to one of said sections, a second shaft, and a series of links connecting the second shaft with the other of said sections.

3. A power-transmitting device consisting of a coupling formed of two sections having interlocking portions clutched together, a shaft fixed to one of said sections, a second shaft, a float, and links connecting said float with the other of said sections and with the second shaft.

4. A power-transmitting device consisting of a shaft, a coupling formed in two sections clutched together, one of which is fixed to said shaft and is formed with internal radial projections, and the other section connected by elastic joints with said first section, a float located within said second section, a series of links pivoted to each other, to the float and to the second section, and a second shaft pivotally connected with the series of links.

5. A power-transmitting device consisting of a coupling formed in two sections, a shaft fixed to one of said sections which consists of a disk with a hoop-shaped flange having internal radial projections; a second shaft having a cross-bar, a notched disk forming the other section located within the hoop-shaped flange of the first section, rubber blocks located between the internal radial projections of the first section and the notched parts of the second section, a float located in the second section, a series of links in pairs located in the second section, the top and bottom pairs of links being pivoted to the second section and to the float, the side pairs of links being pivoted at one end to the top and bottom links and at the other to the cross-bar of the second shaft.

In witness whereof I have hereunto set my hand this 10th day of April, 1895.

ELMER A. SPERRY.

Witnesses:
M. NIELSON,
J. B. LINN.